United States Patent [19]
Logsdon et al.

[11] Patent Number: 5,890,054
[45] Date of Patent: Mar. 30, 1999

[54] EMERGENCY MOBILE ROUTING PROTOCOL

[75] Inventors: Brian D. Logsdon, Akron; Nainesh P. Shah, Strongsville, both of Ohio

[73] Assignee: Telxon Corporation, Akron, Ohio

[21] Appl. No.: 749,928

[22] Filed: Nov. 14, 1996

[51] Int. Cl.$^6$ .............................. H04B 7/15; H04B 7/26
[52] U.S. Cl. .................... 455/11.1; 455/445; 455/517
[58] Field of Search ................... 455/422, 435, 455/445, 11.1, 517, 524, 575, 421, 7, 404

[56] References Cited

U.S. PATENT DOCUMENTS

| | | | |
|---|---|---|---|
| 5,355,511 | 10/1994 | Hatano et al. | 455/11.1 |
| 5,481,539 | 1/1996 | Hershey et al. | 455/466 |
| 5,682,379 | 10/1997 | Mahany et al. | 455/11.1 |
| 5,689,802 | 11/1997 | Luzzato | 455/575 |

*Primary Examiner*—Nguyen Vo
*Attorney, Agent, or Firm*—Renner, Otto, Boisselle & Sklar, P.L.L.

[57] ABSTRACT

An emergency routing protocol within a wireless communication network. A mobile device can establish a communication link to the system backbone even when, for whatever reason, it can no longer communicate directly with a base station. The emergency routing protocol enables a distressed mobile device to communicate with the system backbone through another mobile device serving as an intermediary. The intermediary mobile device forwards information destined to/received from the distressed mobile device to its intended destination.

25 Claims, 9 Drawing Sheets

EMERGENCY MOBILE ROUTING PROTOCOL

TECHNICAL FIELD

The present invention relates generally to wireless communication networks which include mobile devices and base stations. More specifically, the present invention relates to a routing protocol for establishing an emergency communication link between mobile devices and base stations.

BACKGROUND OF THE INVENTION

Wireless communication networks incorporating one or more mobile devices have become increasingly widespread in recent years. Retail stores and warehouses, for example, may use such communication networks with mobile data terminals to track inventory and replenish stock. The transportation industry may use such networks at large outdoor storage facilities to keep an accurate account of incoming and outgoing shipments. In manufacturing facilities, such networks are useful for tracking parts, completed products and defects. Such networks are also utilized in cellular telephone communications to allow users with wireless telephones to roam across large geographic regions while retaining telephonic access. Paging networks also utilize wireless communication networks which enable a user carrying a pocket sized pager to be paged anywhere within a geographic region.

Conventional wireless communication networks such as those referred to above typically involve a cellular network. As is known, cellular networks includes a number of fixed base stations interconnected by a cable medium often referred to as a system backbone. Associated with each base station is a geographic cell. Such cell is a geographic area in which an base station has sufficient signal strength to transmit data to and receive data from a mobile device such as a mobile data terminal or telephone with an acceptable error rate. Typically, base stations will be positioned along the backbone such that the combined cell area coverage from each base station provides full coverage of a building or site. The base stations may be connected via a hardwire connection to the system backbone, or may be connected via a wireless medium as is known.

Mobile devices such as telephones, pagers, personal digital assistants (PDAs), data terminals, etc. are designed to be carried throughout the system from cell to cell. Each mobile device is capable of communicating with the system backbone via wireless communications between the mobile device and a base station to which the mobile device is registered. As the mobile device roams from one cell to another, the mobile device will typically deregister with the base station of the previous cell and register with the base station associated with the new cell.

In order to provide sufficient cell area coverage, base stations within the cellular communication system typically are distributed at separate physical locations throughout an entire geographical region. Even still, it is possible that a mobile device may not be able to register with a base station and/or may lose its communication link with a base station. For example, an established communication link between the mobile device and a base station may incur a sudden increase in noise or interference. Alternatively, a mobile device may wander out of range of any base stations, for example. In such cases the mobile device becomes "distressed" in that communication directly with the system backbone via the base station no longer exists, at least temporarily.

In view of shortcomings such as those discussed above, there is a strong need in the art for a wireless communication network and emergency routing protocol which enables emergency communications between a distressed mobile device and the system backbone. Particularly, there is a strong need for an emergency routing protocol which is transparent to base stations so as to obviate a need to reconfigure operation of the base stations. Furthermore, there is a strong need for an emergency routing protocol which can utilize standard packet format within an existing system so as to eliminate a need for extensive changes in the system.

SUMMARY OF THE INVENTION

The present invention provides an emergency routing protocol within a wireless communication network. A mobile device can regain a communication link to the system backbone when, for whatever reason, it can no longer communicate directly with a base station. The emergency routing protocol enables a distressed mobile device to communicate with the system backbone through another mobile device serving as an intermediary. The intermediary mobile device forwards information destined to/received from the distressed mobile device to its intended destination. Thus, communications between the distressed mobile device and the system backbone are still possible.

According to the present invention, a mobile device may not be able to register with a base station and/or may lose its existing registration. In such instance, the distressed mobile device multicasts a distress packet to any other mobile devices which may be in range of the distressed mobile device. All mobile devices which are within range will receive the distress packet. Those mobile devices which are willing to serve as an intermediary send a response packet back to the distressed mobile device indicating such. The distressed mobile device then selects an intermediary device from those mobile devices which have responded. The selected mobile device is programmed to forward to the appropriate destination any packets which are received from or destined to the distressed mobile device. The distressed mobile device proceeds to register itself with a base station via the intermediary mobile device, and thereafter is able to communicate with the system backbone via the intermediary mobile device.

According to one particular aspect of the invention, an emergency routing method is provided in a wireless communication system including a system backbone, a plurality of mobile devices, and one or more base stations coupled to the system backbone, the plurality of mobile devices being configured to move about the system and to communicate wirelessly with the system backbone by way of the one or more base stations. The emergency routing method comprising the steps of a first mobile device among the plurality of mobile devices attempting to communicate with the system backbone by communicating wirelessly and directly with any of the one or more base stations; determining whether the first mobile device is able to communicate directly with any of the one or more base stations; and in the event the first mobile device is unable to communicate directly with any of the one or more base stations, the first mobile device establishing a wireless communication link with any of the one or more base stations using a second mobile device from among the plurality of mobile devices as an intermediary for communications between the first mobile device and the any of the one or more base stations.

According to another aspect of the invention, a wireless communication system is provided. The system includes a system backbone; a plurality of mobile devices; and one or more base stations coupled to the system backbone, the plurality of mobile devices being configured to move about the system and to communicate wirelessly with the system backbone by way of the one or more base stations, wherein a first mobile device among the plurality of mobile devices comprises circuitry for attempting to communicate with the system backbone by communicating wirelessly and directly with any of the one or more base stations, and in the event the first mobile device is unable to communicate directly with any of the one or more base stations the circuitry of the first mobile device establishes a wireless communication link with any of the one or more base stations using a second mobile device from among the plurality of mobile devices which include circuitry to operate as an intermediary for communications between the first mobile device and the any of the one or more base stations.

In accordance with yet another aspect, a mobile device is provided for use in a in a wireless communication system including a system backbone, a plurality of other mobile devices, and one or more base stations coupled to the system backbone, the plurality of other mobile devices being configured to move about the system and to communicate wirelessly with the system backbone by way of the one or more base stations. The mobile device includes: a radio frequency (RF) transceiver; a processor programmed to attempt to communicate with the system backbone by communicating wirelessly and directly via the RF transceiver with any of the one or more base stations, to determine whether the mobile device is able to communicate directly with any of the one or more base stations, in the event the mobile device is unable to communicate directly with any of the one or more base stations, for establishing a wireless communication link via the RF transceiver with any of the one or more base stations using a second mobile device from among the plurality of other mobile devices as an intermediary for communications between the mobile device and the any of the one or more base stations.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

The present invention will now be described with reference to the drawings wherein like reference numerals are used to refer to like elements throughout. As mentioned above, the present invention relates to wireless communication networks which include mobile devices that can roam from cell to cell. Such mobile devices can be data terminals, telephones, pagers, etc. In the exemplary embodiment described hereinafter, the mobile device is a mobile terminal used to communicate data such as inventory or the like. However, it is recognized that the invention contemplates other types of mobile devices and is not intended to be limited to systems utilizing mobile terminals.

Figure 1:
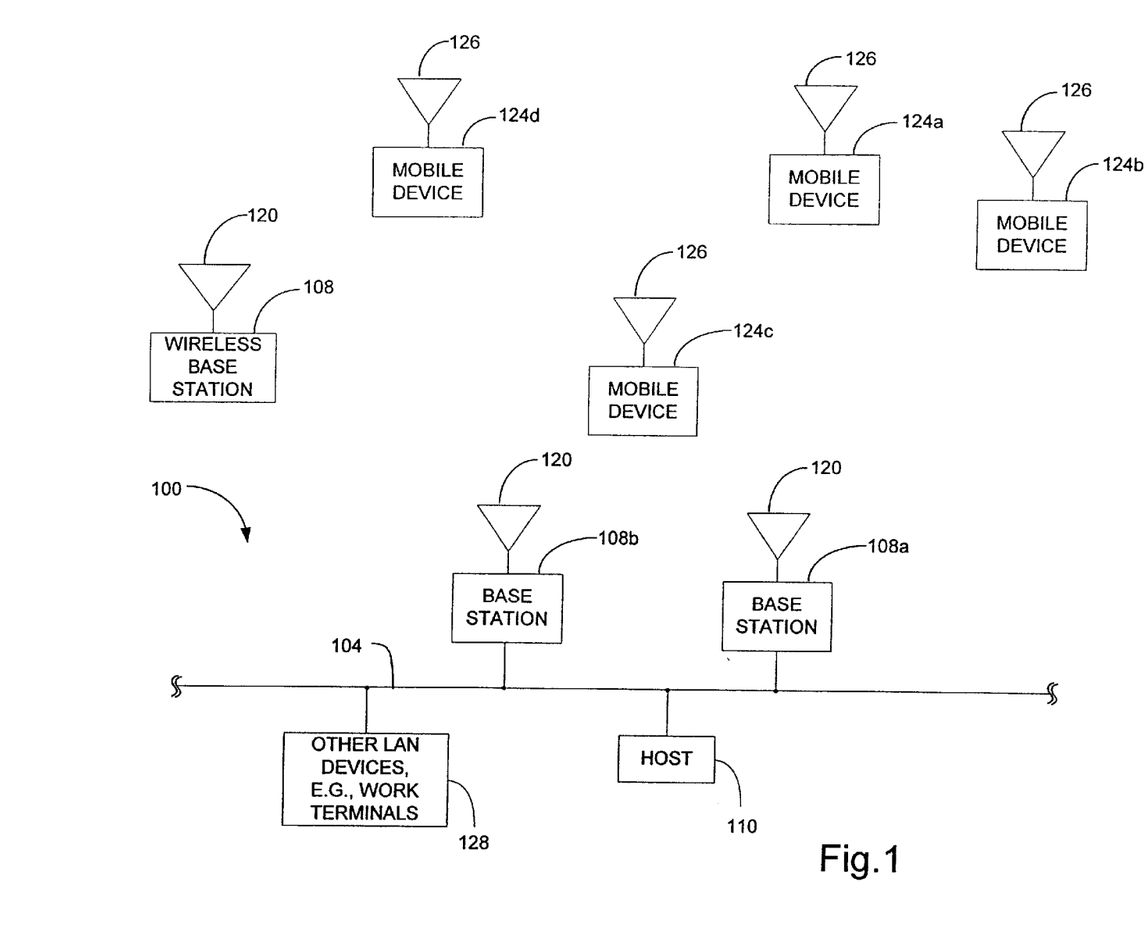
FIG. 1 is a block diagram of a wireless communication network in accordance with the present invention.

Referring now to FIG. 1, a wireless communication network in the form of a cellular communication system 100 is shown in accordance with the exemplary embodiment of the present invention. The cellular communication system 100 includes a network having a backbone 104. The backbone 104 may be a hardwired data communication path made of twisted pair cable, shielded coaxial cable or fiber optic cable, for example, or may be wireless in nature. Connected to the system backbone 104 are several base stations 108 (e.g., 108a, 108b). Each base station 108 serves as an entrance point through which wireless communications may occur with the system backbone 104. Additionally, in order to expand the effective communication range of the base stations 108, one or more wireless base stations 108' are also included in the cellular communication system 100.

As is conventional, each wireless base station 108' associates itself, typically by registration, with another base station 108, whether hardwired or wireless, such that a link is formed between itself and other devices situated on the system backbone 104. For example, in the system 100 shown in FIG. 1 a wireless base station 108' associates itself with one of the base stations 108 connected to the system backbone 104 so that a communication link is formed between the wireless base station 108' and a host computer 110 coupled to the system backbone 104. All communications between the wireless base station 108' and a device on the system backbone 104 are made possible by the other base stations on the same link which are configured to relay communications therebetween.

Each base station 108,108' is capable of wirelessly communicating with other devices in the system 100 via an antenna 120. A geographic cell associated with each base station 108, 108' defines a region of coverage in which successful wireless communication may occur. Depending on the type of antenna 120 selected and output power of the respective base station, the cell may take one of several different forms and sizes. For example, utilizing an omnidirectional antenna results in a generally spherical cell area of coverage. However, a directed yagi-type antenna or other form of antenna could also be used as will be readily appreciated.

The cellular communication system 100 also includes one or more mobile devices 124 (e.g., 124a–124d). Each mobile device 124 communicates with devices on the system backbone 104 via a selected base station 108, 108'. Upon roaming from one cell to another, the mobile device 124 is configured to associate itself with a new base station 108, 108' through a conventional procedure commonly referred to as registration.

Each mobile device 124 includes an antenna 126 for communicating wirelessly within the network. During normal operation, a mobile device 124 employs conventional cellular communication techniques and communicates with a device on the system backbone 104 (e.g., a host computer 110 or other devices 128) via the base station 108, 108' to which it is registered. For example, the mobile device 124a may transmit information to the host computer 110 by wirelessly transmitting an information packet to base station 108a with which it is registered. The base station 108a in turn forwards the packet to the host computer 110 via the system backbone 104. Likewise, if the host computer 110 wishes to send information to the mobile device 124a the host computer 110 first delivers by way of the system backbone 104 an information packet to the base station 108a with which the mobile device 124a is registered. The base station 108a then forwards the packet to the mobile device 124a via a wireless communication.

It is possible, however, that the wireless communication link between the mobile device 124a and the base station 108a may become broken for whatever reason. For example, the mobile device 124a may wander too far out of range of the base station 108a cell coverage. In such instances, it is necessary for the mobile device 124a to register with a new base station 108,108' if it wishes to maintain a communication link with the system backbone 104.

In the event the mobile device 124a is unable to register directly with another base station 108,108' via conventional procedures, the emergency routing protocol of the present invention is implemented. More specifically, the mobile device 124a multicasts a distress packet as part of a protocol described more fully below in connection with FIGS. 3A–3C. Those mobile devices 124 which are within range of the mobile device 124a (e.g., mobile devices 124b and 124c) receive the distress packet. The mobile devices 124b and 124c determine if they are willing to serve as an intermediary mobile device with respect to communications between the distressed mobile device 124a and the system backbone 104. If yes, the mobile devices 124b and 124c transmit response packets back to the mobile device 124a informing it that they are willing to serve as intermediaries.

In turn, the distressed mobile device 124a selects one of the mobile devices 124b and 124c to serve as an intermediary and transmits a packet thereto informing the particular mobile device 124 that it has been selected. For example, the mobile device 124a may select mobile device 124c to serve as an intermediary. Mobile device 124c is configured such that it will acknowledge its selection by transmitting an acknowledgement packet to the mobile device 124a. Mobile device 124a then attempts to register with a base station via the intermediary mobile device 124c. The distressed mobile device 124a attempts such registration according to any of the same conventional techniques it may utilize in cases where there is no intermediary. In the present invention, however, the intermediary mobile device 124c in such situation serves to forward any packets it receives from the distressed mobile device 124a. Similarly, the intermediary mobile device 124c forwards to the distressed mobile device 124a any packets it receives which are destined to the distressed mobile device 124a.

In such manner, the mobile device 124a can still register with a base station 108, 108' through the mobile device 124c. Such base station is likely to be the same base station 108, 108' that the mobile device 124c is registered with (e.g., 108b). This is because the base station that the mobile device 124c is registered with will likely be the one to receive registration requests which are broadcasted by the distressed mobile device 124a when they are rebroadcast by the intermediary mobile device 124c. However, in the case where there is overlapping cell coverage among multiple base stations at the location of mobile device 124c, it is possible that the distressed mobile device 124a will register with a base station 108, 108' which is different from that with which the mobile device 124c is registered.

Upon registration according to the emergency routing protocol, the mobile device 124a carries out communications with devices on the system backbone 104 using the mobile device 124c as an intermediary. The mobile device 124c stores the network identity of the distressed mobile device 124a in an emergency routing table maintained within the mobile device 124c. When the mobile device 124c receives a packet it checks its emergency routing table to determine if the packet is either destined to a distressed mobile device or is from a distressed mobile device for which the mobile device 124c is serving as an intermediary (e.g., mobile device 124a ). If so, the mobile device 124c forwards the packet to its intended destination.

The distressed mobile device 124a is configured to check periodically if it is possible to register directly with a base station. If possible, the mobile device 124a terminates its emergency link through the intermediary mobile device 124c as described below. The mobile device 124a proceeds to register directly with a base station 108, 108' according to conventional techniques.

Figure 2:
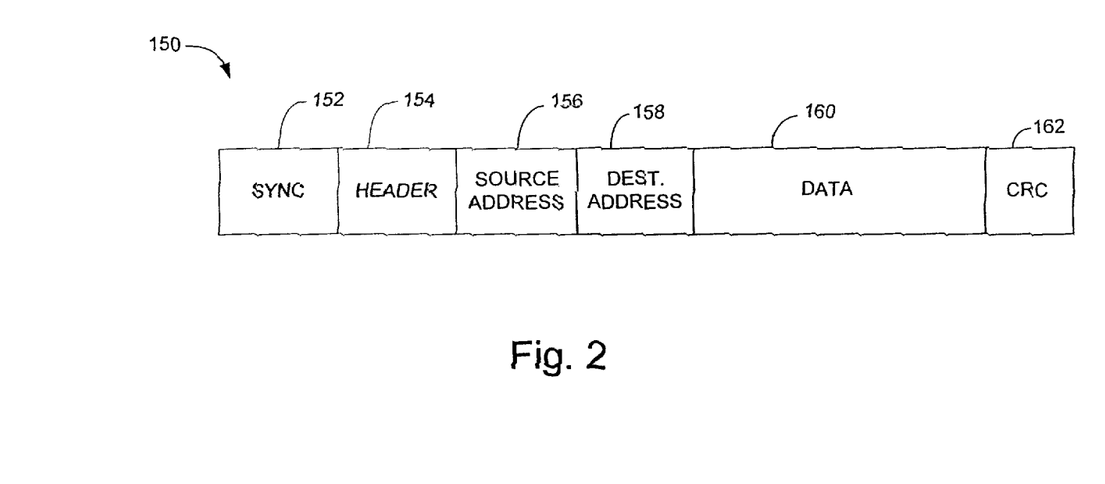
FIG. 2 is a schematic representation of a standard packet format in accordance with the present invention.

Referring now to FIG. 2, information is transmitted between the various devices within the system 100 preferably in the form of packets 150. As shown, each packet 150 includes a synchronization field 152 which includes synchronizing bits which allow a device receiving the packet an opportunity to "lock on" to the packet as is conventional. A header field 154 follows the synchronization field 152 and includes information such as the length and type of the packet. For example, the header field 154 may indicate whether the packet is a conventional network communication packet or, for purposes of the present invention for establishing emergency routing, a distress packet, a response packet, a selection packet, an acknowledgement packet, or a pause packet, each of which is described more fully below.

A source address field 156 follows the header field 154 and includes the address of the device from which the packet 150 originated. Following the source address field 156, the packet 150 includes a destination address field 158 which holds the address of the device to which the packet 150 is ultimately destined. In the event the packet is being multicasted or broadcasted, the destination address in field 158 is set to some predefined address such as all "1's " so as to be recognized as such by all devices which receive the packet. A data field 160 in the packet 150 includes various information intended to be communicated to the receiving device in connection with normal communications. The packet 150 ends with a cyclical redundancy code (CRC) field 162 which serves as an error correcting field according to conventional techniques whereby a receiving device can determine if it has properly received the packet 150.

Figure 3A:
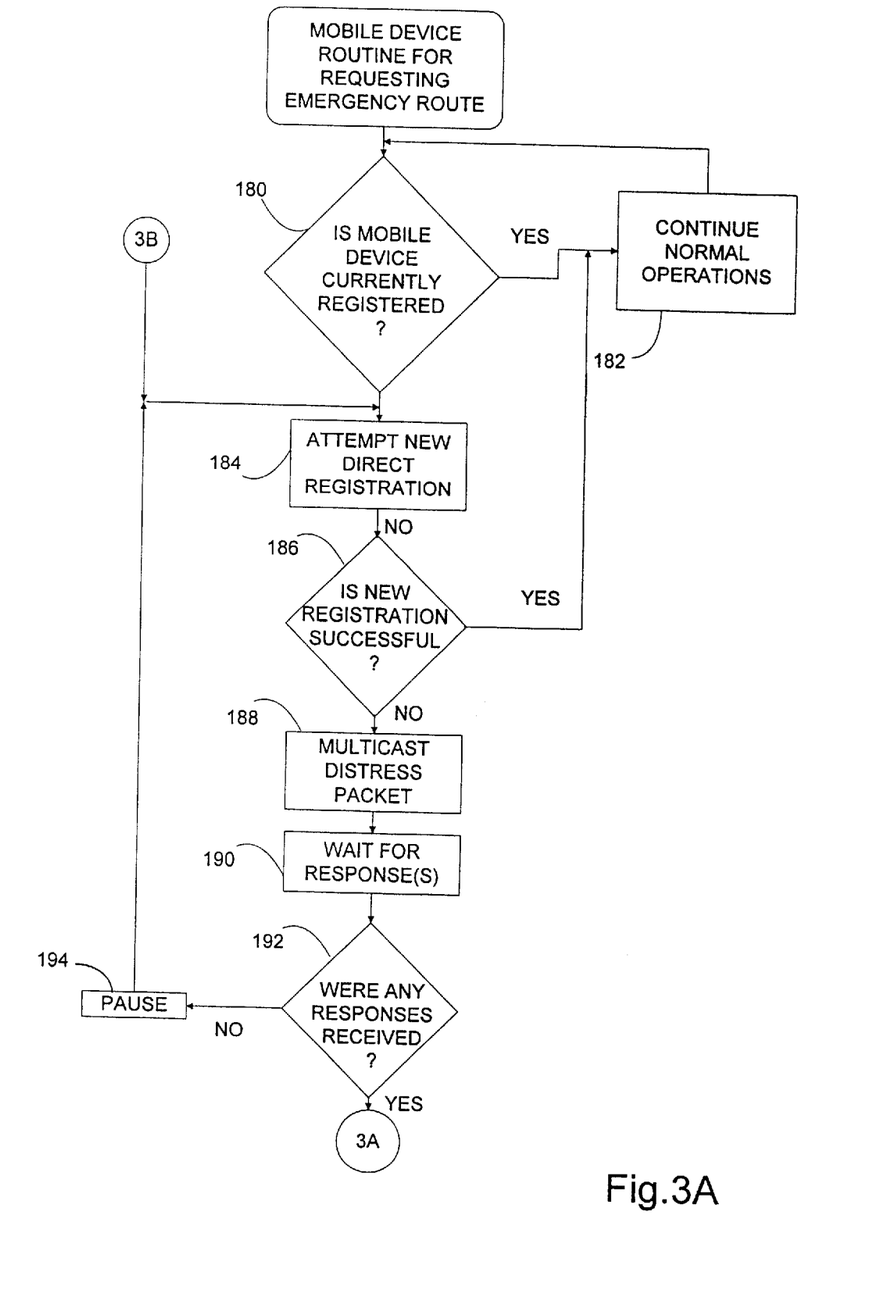
FIGS. 3A, 3B and 3C form a flowchart representing the process by which a distressed mobile device registers and communicates with a base station through an intermediary mobile device in accordance with the present invention.
Figure 3B:
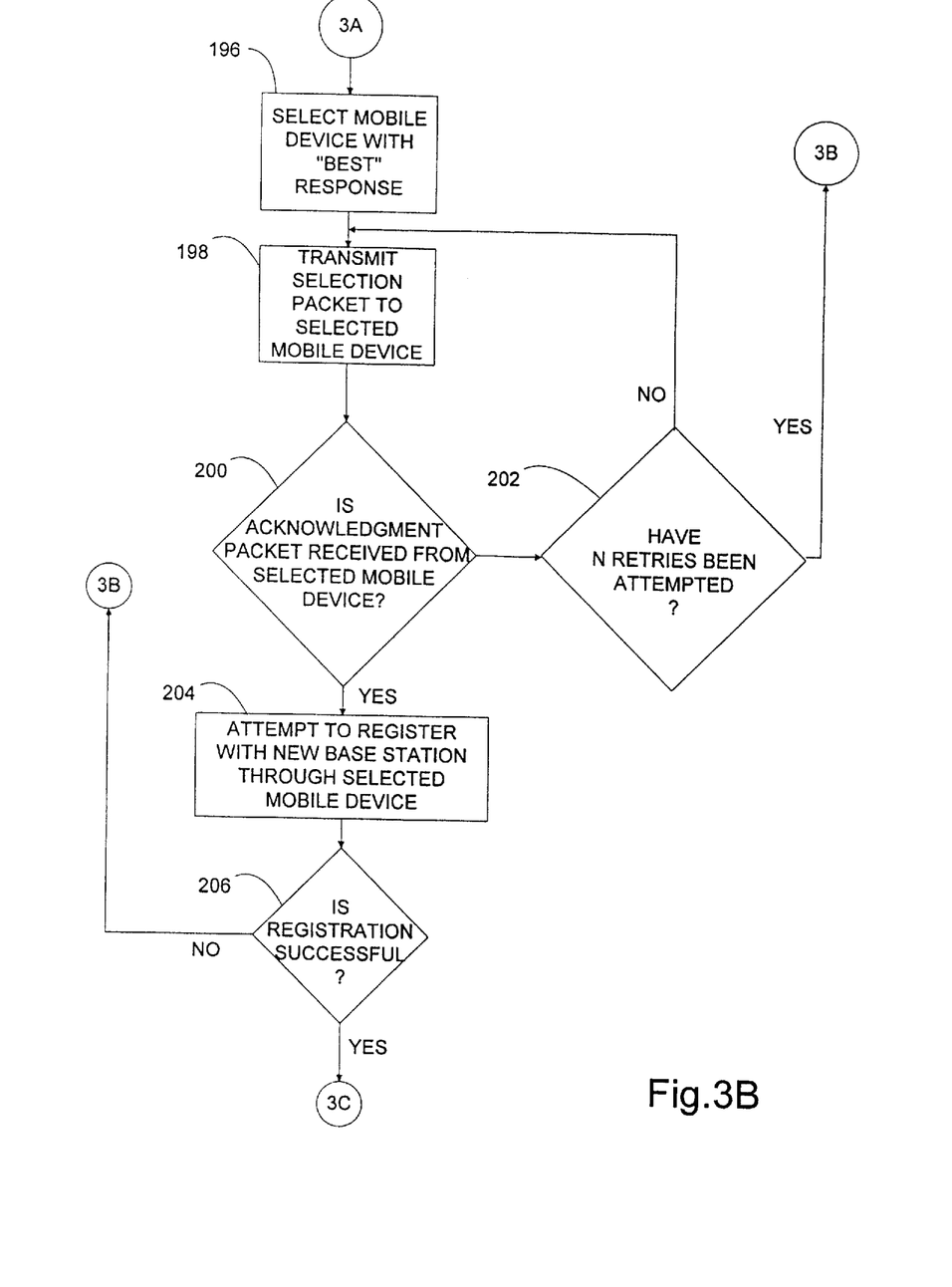
Figure 3C:
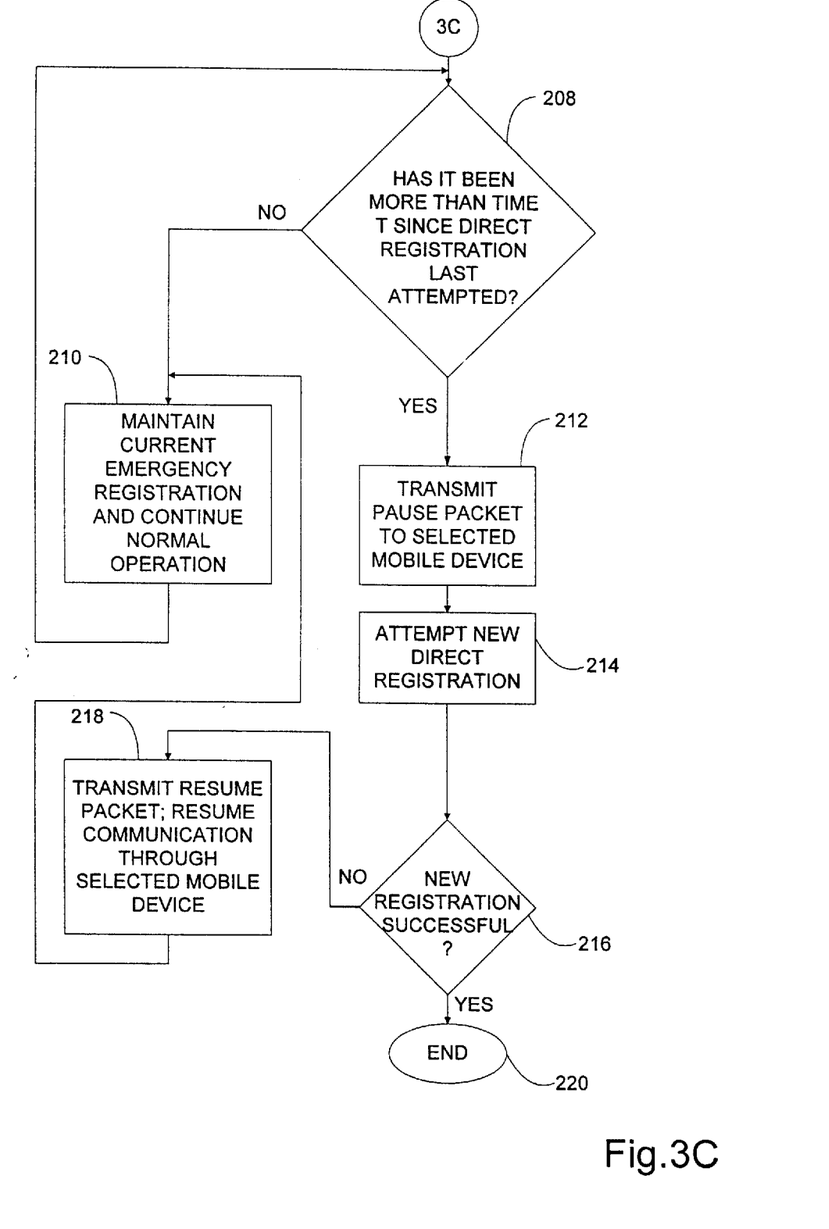

FIGS. 3A–3C represent the routine carried out by each of the mobile devices 124 for requesting emergency routing in accordance with the present invention. Beginning in step 180, a mobile device 124 determines whether it is currently registered to a base station 108, 108' according to conventional techniques. If yes, the mobile device 124 proceeds to step 182 in which it continues its normal operations within the system 100. Such operations may include the processing of inventory data, etc. If the mobile device 124 is not currently registered in step 180, this could be due to a number of reasons. For example, the mobile device 124 may have been powered up only recently and has not yet registered with a base station. Alternatively, the mobile device 124 may have wandered outside the geographic cell coverage of the base station 108, 108' to which it had previously been registered. As a further alternative, the mobile device 124 may incur significant interference or noise in its communications with its base station 108 making communication therebetween impossible and hence lose registration.

Regardless of the particular reason, the mobile device 124 will then proceed from step 180 to step 184. In step 184, the mobile device 124 attempts to register directly with any available base station 108,108'. Such attempted registration is in accordance with any of various known conventional techniques whereby a mobile device 124 attempts to register with a base station. For example, the mobile device 124 multicasts a find router packet seeking a route to the system backbone. Receiving base stations respond by sending router identification information, etc. The particular registration protocol carried out in step 184 is well known and conventional, and not germane to the present invention. Hence, further detail is omitted in this regard.

Following step 184 in which the mobile device 124 attempts to register directly with a base station 108,108', the mobile device 124 proceeds to step 186. In step 186 the mobile device 124 determines if the registration attempt in step 184 was successful. If yes, the mobile device 124 proceeds to step 182 whereby it begins/continues normal operations within the system 100. Otherwise, the mobile device 124 proceeds to step 188 in which it is concluded that emergency routing is required as the mobile device 124 has been unable to register with a base station according to conventional techniques.

In step 188, the mobile device 124 multicasts a distress packet indicating that the source of the packet is in need of assistance from any other mobile devices 124 which are within range. The distress packet is of the form shown in FIG. 2, where the header field 154 indicates that the packet is a distress packet. As is discussed in more detail below in relation to FIGS. 4A–4B, those mobile devices 124 which receive the distress packet and are willing to serve as an intermediary transmit a response packet back to the source of the distress packet (i.e., the distressed mobile device 124). Thus, following step 188 the distressed mobile device 124 in step 190 waits a predetermined time (e.g., 500 milliseconds (msec)) during which the distressed mobile device 124 waits to receive any response packets from other mobile devices. Next, in step 192 the mobile device 124 determines if any response packets were received in step 190. If no, this indicates that no other mobile devices 124 are available to serve as an intermediary and the distressed mobile device 124 proceeds to step 194 in which it pauses for a predetermined period of time (e.g., 500 msec). Following step 194, the mobile device 124 returns to step 184 and re-attempts direct registration as shown.

In the event response packets are received by the distressed mobile device 124 as determined in step 192, the mobile device 124 proceeds to step 196. In step 196, the distressed mobile device 124 selects from among the responses the mobile device 124 which has the "best" response packet. Such selection can be based on criteria such as the response packet which was received with the highest "received signal strength indicator" ("RSSI"), the lowest number of hops, etc., all of which are conventional criteria for selecting from among multiple devices in a wireless network. Following step 196 the distressed mobile device 124 in step 198 transmits a selection packet to the mobile device selected in step 196. The selection packet is identified as such in the header field 154 of the packet, and functions to inform the selected mobile device 124 that it has been selected to serve as an intermediary device. The destination address in field 158 of the selection packet is taken from the source address of the response packet associated with the selected mobile device 124.

As described below in connection with FIGS. 4A–4B, mobile devices 124 which are selected to serve as intermediaries are configured to transmit an acknowledgement packet back to the distressed mobile device 124 to acknowledge that the intermediate route has been established. Accordingly, following step 198 the distressed mobile device 124 in step 200 determines if an acknowledgement packet has been received from the selected mobile device 124. If not, the distressed mobile device 124 proceeds to step 202 in which it determines if a predetermined number N of retries (e.g., where N=4) have been attempted since first failing to receive an acknowledgement packet from the selected mobile device 124. If not, the distressed mobile device 124 returns to step 198 and retransmits a selection packet to the selected mobile device. If yes in step 202, meaning at least N+1 attempts have been made, the distressed mobile device 124 returns to step 184 and the above process is repeated.

In the event an acknowledgment packet is received in step 200, the distressed mobile device 124 proceeds to step 204. In step 204 the distressed mobile device 124 attempts to re-establish a communication link with the system backbone 104 by registering itself with a base station 108, 108'. Thus, in step 204 the distressed mobile device 124 carries out its conventional registration routine of transmitting a find router packet, waiting for router identifications from other base stations, etc. As is discussed below in connection with FIG. 5, all packets which are transmitted from/to the distressed mobile device 124 are received by the intermediary base station 124 and are forwarded (including via direct transmission and multicasting or broadcasting) to the desired destination. Accordingly, the operation of the intermediary base station 124 becomes effectively transparent relative to communications between the distressed mobile device 124 and any base stations during the registration process and thereafter.

In step 206, the distressed mobile device 124 determines if registration via step 204 was successful. If not, the mobile device 124 returns to step 184 and repeats the above process in an attempt to become registered. If, on the other hand, registration was successful as determined in step 206, the distressed mobile device 124 is now able to carry out normal operations as if it were registered directly to a base station 108, 108'. The intermediary mobile device 124 simply forwards packets received from/directed to the distressed mobile device 124. The distressed mobile device 124 and the base station 108, 108' with which it is registered communicate with each other in the same manner as if the intermediary base station 108, 108' did not exist.

Following step 206, the distressed mobile device 124 proceeds to step 208 in which it checks whether more than a predetermined time period T has elapsed since the distressed mobile device 124 has last attempted to register directly with a base station 108, 108'. In the exemplary embodiment, the time period T may be one minute, for example. In the event time period T has not passed as determined in step 208, the distressed mobile device 124 proceeds to step 210 in which it maintains its current registration through the intermediary mobile device 124 and continues to carry out normal operations. Following step 210, the distressed mobile device 124 returns to step 208.

Hence, the distressed mobile device 124 continues to loop through steps 208 and 210 while carrying out normal operations via the intermediary mobile device 124 until time period T has passed.

Upon time period T elapsing as determined in step 208, the distressed mobile device 124 reevaluates whether it is possible to register directly with a base station 108, 108'. In order to do so, the distressed mobile device 124 first proceeds to step 212 in which it transmits a pause packet to the intermediary mobile device 124. The pause packet is identified as such in the header field 154, and instructs the intermediary mobile device 124 to stop forwarding packets destined to the distressed mobile device 124. Then, in step 214 the distressed mobile device 124 again attempts to register directly with a base station 108, 108' in the same manner discussed above in relation to step 184. Next, in step 216 the distressed mobile device 124 determines if the registration attempted in step 214 was successful. If not, the distressed mobile device 124 proceeds to step 218 in which it transmits a resume packet to the intermediary device 124 instructing the device to resume forwarding packets relating to the distressed mobile device 124. In addition, the distressed mobile device 124 continues normal operations via the intermediary mobile device 124 and returns to step 210. On the other hand, if the new registration attempt was successful as determined in step 216, the process is completed as represented in step 220. Thereafter, operation of the mobile device 124 continues in a conventional manner and returns to step 180 (return not shown).

Although not shown in FIGS. 3A–3C, each mobile device 124 is configured such that from step 204 onward, if the distressed mobile device 124 loses communication with the intermediary mobile device 124, the distressed mobile device 124 returns to step 184. The distressed mobile device 124 may determine that it has lost communication by noting a lack of communication and/or acknowledgments otherwise expected from the intermediary mobile device. In the event the distressed mobile device 124 multicasts another distress packet, the intermediary mobile device 124 is programmed to respond always to distress packets from devices which are already included in its emergency routing table.

Figure 4A:
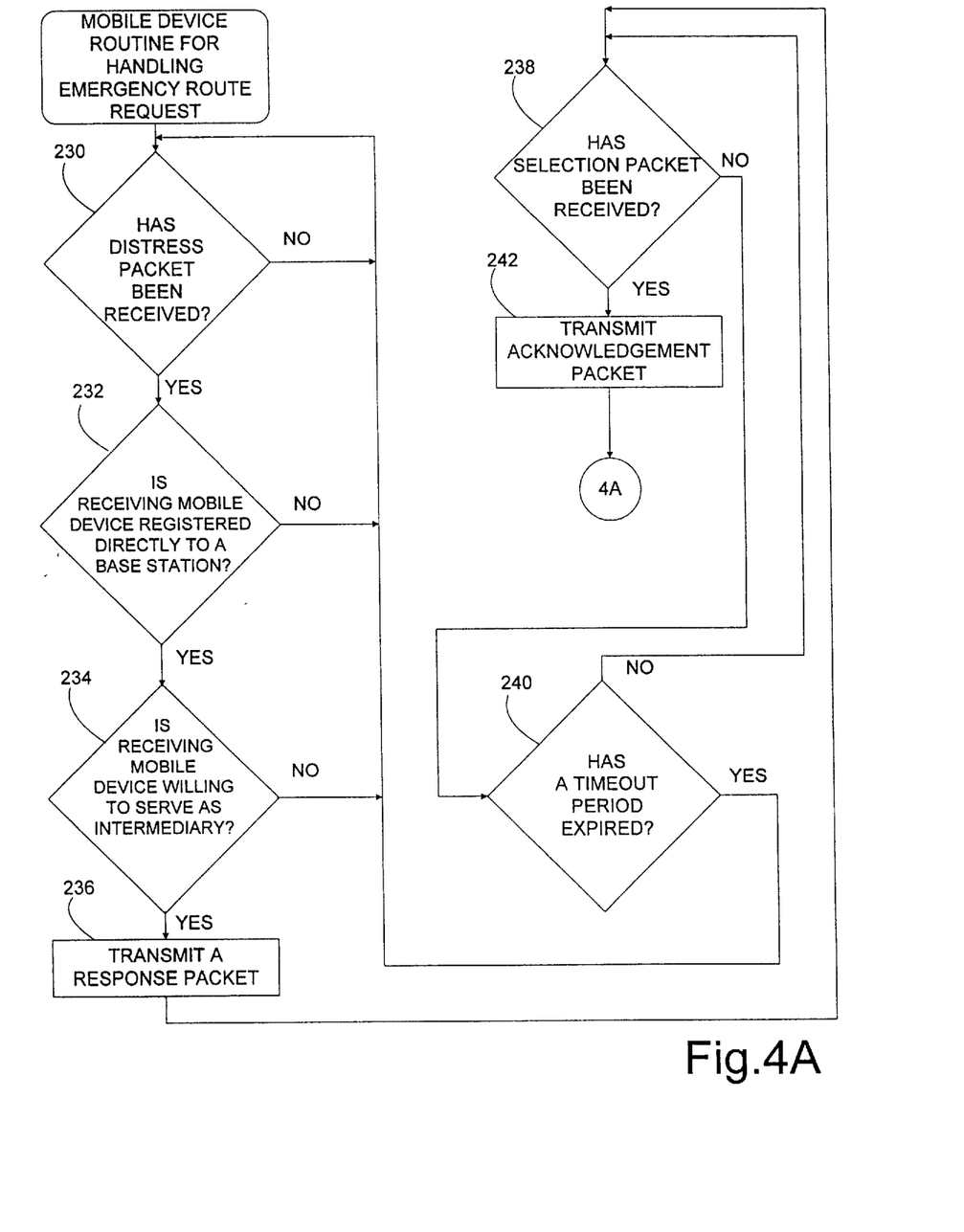
FIGS. 4A and 4B form a flowchart representing the procedure carried out by mobile devices capable of serving as an intermediary in accordance with the present invention.
Figure 4B:
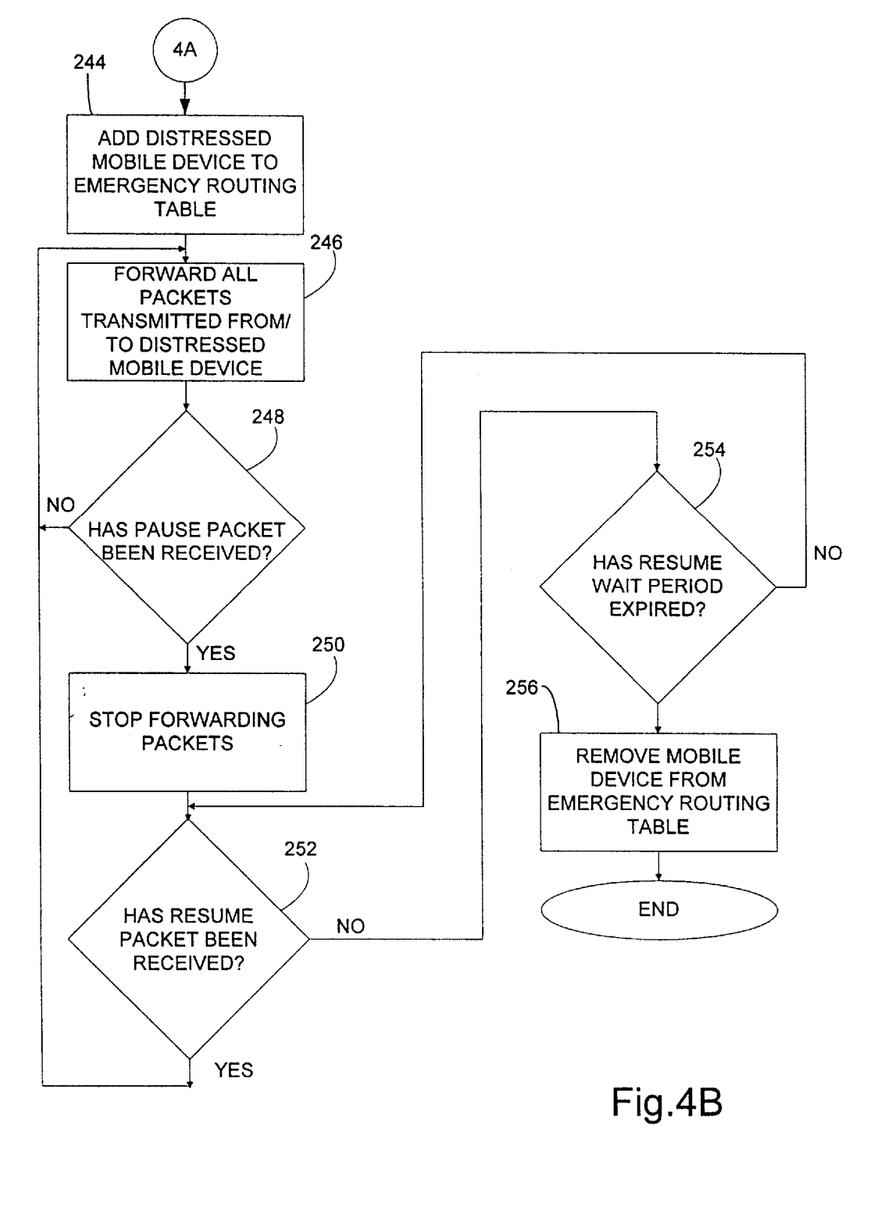

Referring now to FIGS. 4A–4B, a flowchart describing the operation of those mobile devices 124 which are capable of serving as intermediary devices is shown. Beginning in step 230, a mobile device 124 determines if it has received a distress packet from a distressed mobile device 124 (see, supra, step 188). If not, the mobile device 124 continues to loop through step 230 as shown. If a distress packet is received, the mobile device 124 proceeds to step 232 in which it is determined if the mobile device 124 is registered directly to a base station 108, 108' (i.e., is not itself registered through an intermediary mobile device 124). If no in step 232, the mobile device 124 returns to step 230. Otherwise, the mobile device 124 proceeds to step 234. Step 232 is implemented in the preferred embodiment since it is preferred that only those mobile devices 124 which themselves are registered directly to a base station 108, 108' serve as intermediaries. Since communication links through intermediary mobile devices are likely to be only temporary, it is preferable to avoid routing distressed mobile devices through an intermediary mobile devices through an intermediary mobile device. Nevertheless, such requirement is by no means necessary.

In step 234 the mobile device 124 determines if it is willing to serve as an intermediary. For example, the mobile device 124 may consider its current communication capacity as far as communications involving itself or communications for other mobile devices for which it may currently be serving as an intermediary. Alternatively, for example, the mobile device 124 may be programmed not to serve as an intermediary for more than K (e.g., where K=2) other mobile devices. Thus, in step 234 the mobile device 124 may evaluate its current communication capacity and/or the number of other mobile devices for which it is currently serving as an intermediary. If the mobile device 124 is at capacity or is otherwise handling K other mobile devices as an intermediary, the mobile device 124 returns to step 230. Otherwise, the mobile device 124 concludes it is willing to serve as an intermediary. The mobile device 124 in this case continues to step 236 in which it transmits a response packet as discussed above, informing the distressed mobile device 124 that it is willing to serve as an intermediary. The mobile device 124 determines the destination address for the response packet (and hence the identity of the distressed mobile device 124) based on the source address in field 156 of the distress packet as will be appreciated.

Following step 236, the mobile device 124 proceeds to step 238 in which it determines if it has received a selection packet (see, supra, step 198) indicating that the mobile device 124 has been selected to serve as an intermediary. If not, the mobile device 124 proceeds to step 240 where it determines if a predetermined timeout period has expired since the mobile device 124 transmitted the response packet in step 236. If not, the mobile device 124 continues to loop through step 238. The predetermined time period in step 240 preferably is selected so as to be the maximum time which it can be expected that it will take a distressed mobile device 124 to transmit a selection packet based on the responses received in step 190.

If in step 240 the predetermined timeout period has expired, the mobile device 124 concludes it was not selected to be an intermediary device and returns to step 230. On the other hand, if the mobile device 124 is selected by virtue of receiving a selection packet as determined in step 238, the mobile device 124 proceeds to step 242. The mobile device 124 in step 242 transmits an acknowledgement packet to the distressed mobile device 124 to indicate that the emergency communication link is now in place. Immediately thereafter, the mobile device in step 244 adds the identity of the distressed mobile device 124 to its emergency routing table. Next, the mobile device 124 proceeds to step 246 in which with respect to the packets the mobile device 124 receives it forwards all packets transmitted from/to the distressed mobile device 124 as part of a packet handling routine described in more detail below in connection with FIG. 5. In addition, in step 248 the mobile device 124 continuously checks whether it has received a pause packet from the distressed mobile device 124 (see, supra, step 212). If no, the mobile device 124 continues to forward packets relating to a distressed mobile device 124 in step 246 as part of its packet handling routine.

If in step 248 it is determined that a pause packet has been received from a distressed mobile device 124, the intermediary mobile device 124 stops forwarding packets to the distressed mobile device 124 as represented in step 250. In this manner, the distressed mobile device 124 will not receive packets from the intermediary mobile device 124 as it attempts to register directly with a base station 108, 108' as discussed above in connection with step 214. Next, in step 252 the mobile device 124 determines if a resume packet has been received (relating to step 218) indicating that the mobile device 124 should resume forwarding packets relating to the distressed mobile device 124. If yes, the mobile device returns to step 246 in which it resumes forwarding packets it receives.

If a resume packet has not been received as determined in step 252, the mobile device 124 proceeds to step 254 in which it determines if a predetermined resume wait period has expired. If yes, it is assumed that the distressed mobile device 124 has been able to register directly with a base station 108, 108'. Hence, the mobile device 124 proceeds to step 256 in which it removes the distressed mobile device 124 from its emergency routing table. If the predetermined resume wait period has not expired as determined in step 254, the mobile device 124 loops back through step 252 as shown.

Figure 5:
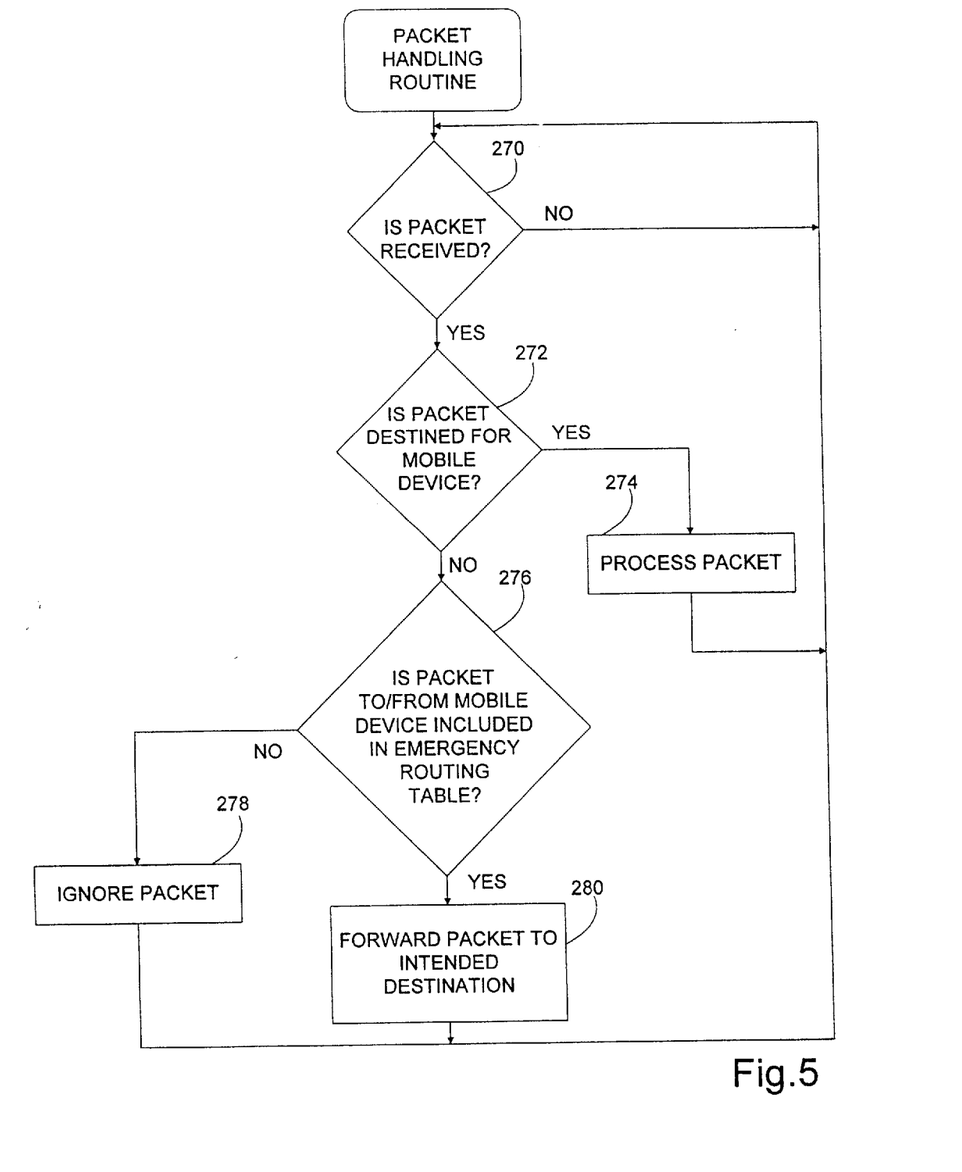
FIG. 5 is a flowchart representing the manner in which packets are handled by mobile devices serving as intermediaries in accordance with the present invention.

FIG. 5 shows the basic packet handling routine for mobile devices 124 which serve as intermediaries in accordance with the present invention. In step 270, the mobile device 124 determines if a packet has been received. If not, the mobile device 124 continues to loop through step 270. If a packet is received, the mobile device 124 proceeds to step 272 in which it determines from the destination address field 158 of the packet whether the packet is destined for that particular mobile device 124. If yes, the mobile device 124 continues to step 274 in which it processes the packet as part of its conventional operation. Thereafter, the mobile device 124 returns to step 270 as shown.

If in step 272 the mobile device 124 concludes that the received packet is not destined to itself, it proceeds to step 276 in which it determines if the packet is directed to or is transmitted from any distressed mobile devices 124 identified in its emergency routing table. More specifically, the mobile device 124 determines whether the address in either the source address field 156 or destination address field 158 of the received packet matches the address of any distressed mobile devices stored in its emergency routing table. If no, the mobile device 124 is not serving as an intermediary with respect to the received packet and the mobile device 124 proceeds to step 278 in which it ignores the remainder of the packet. The mobile device 124 then returns to step 270.

On the other hand, if the source address or destination address of the received packet does match one of the distressed mobile devices included in the emergency routing table as determined in step 276, the mobile device concludes it is serving as an intermediary. Consequently, the mobile device 124 proceeds to step 280 in which the mobile device 124 simply forwards the received packet to its intended destination before returning to step 270. It will be noted that it is not necessary for the mobile terminal 124 in step 280 to process or manipulate the received packet. In other words, the received packet is transmitted by the mobile device 124 with the same source address and destination address which originally appeared in the packet when it was received. In essence, the mobile device 124 simply intercepts the packet and wirelessly retransmits the packet as though it was never received by the mobile device 124 serving as an intermediary.

Thus, even if a mobile device 124 is unable to register directly with a base station the present invention allows for other mobile devices within the system to serve as intermediaries to allow for emergency routing. A feature of the present invention is that emergency routing, as accomplished by an intermediary mobile device, is transparent to the base stations 108, 108'. Thus, no special code or protocol needs to be implemented in the base stations. Furthermore, no additional fields or changes to the standard system packet format is necessary.

Figure 6:
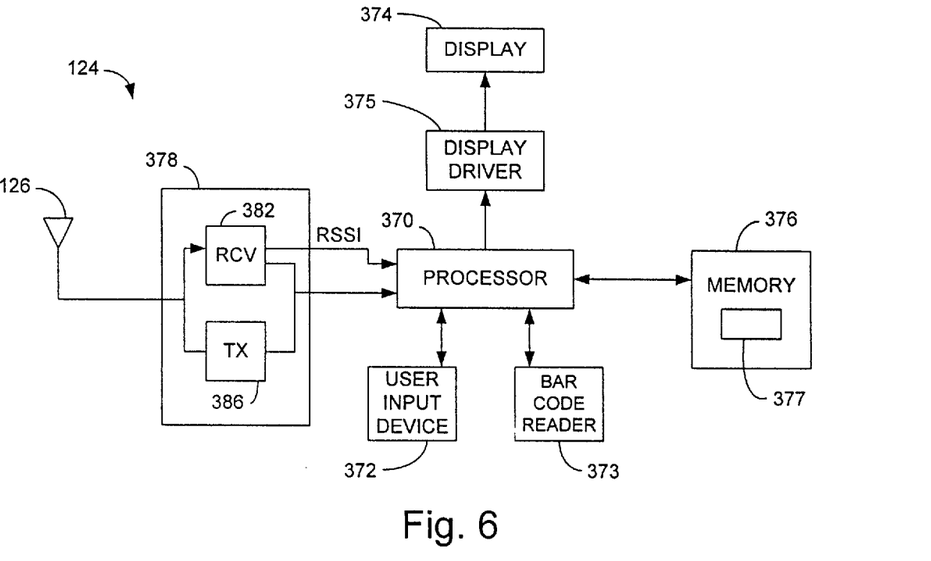
FIG. 6 is a block diagram of a mobile device in accordance with the present invention.
Figure 7:
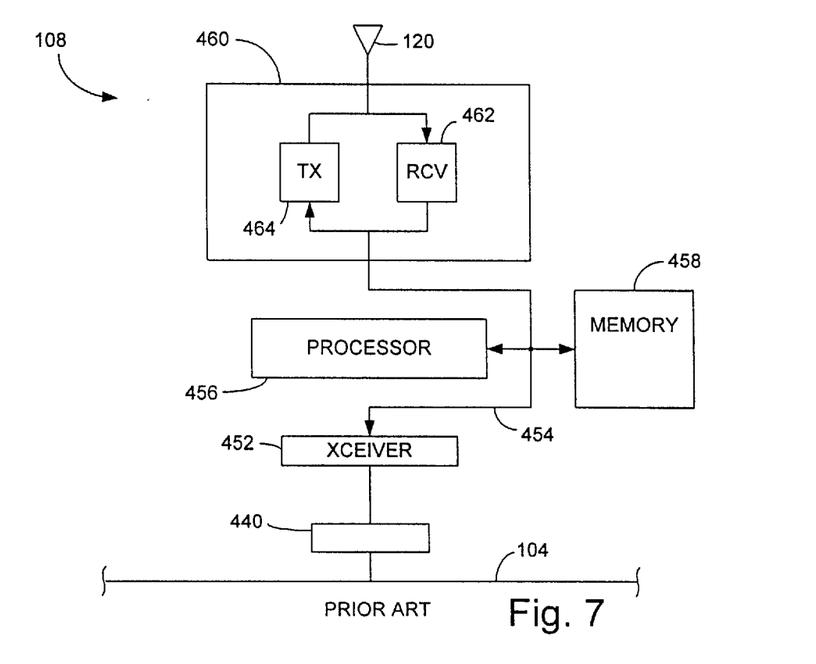
FIG. 7 is a block diagram of a conventional base station.

Turning now to FIGS. 6 and 7, exemplary block diagrams for mobile devices 124 and base stations 108 are respectively shown. Referring first to FIG. 6, each mobile device 124 includes a processor 370 which can be programmed to control and to operate the various components within the mobile device 124 in order to carry out the various functions described herein. The processor 370 is coupled to an operator input device 372 which allows an operator to input data to be communicated to the system backbone 104 such as inventory data, patient information, etc. This information may be sent to the host computer 110 which serves as a central data location, for example, or to a cash register connected to the system backbone 104, as another example, for providing price information. The input device 372 can include such items as a keypad, touch sensitive display, etc. The mobile device 124 also may include a bar code scanner 373 coupled to the processor 170 for providing another form of data input. A display 374 is also connected to and controlled by the processor 370 via a display driver circuit 375. The display 374 serves as a means for displaying information stored within the mobile device 124 and/or received over the system backbone 104 via a base station 108, 108'. The display 374 can be a flat panel liquid crystal display with alphanumeric capabilities, for example, or any other type of display as will be appreciated.

A memory 376 is included in each mobile device 106 for storing program code executed by the processor 370 for carrying out the functions described herein and as represented in the flowcharts of FIGS. 3A–3C, 4A–4B and 5. The actual code for performing such functions could be easily programmed by a person having ordinary skill in the art of computer programming in any of a number of conventional programming languages based on the disclosure herein. Consequently, further detail as to the particular code has been omitted for sake of brevity. Included within the memory 376 is a portion of memory 377 allocated to storing the contents of the emergency routing table discussed above. The processor 370 can store, access and clear entries from the emergency routing table using conventional memory access techniques. The memory 376 also serves as a storage medium for storing information packets 150 received from or intended to be transmitted to a base station 108, 108' or mobile device 124 as discussed herein.

Each mobile device 124 also includes its own RF section 378 connected to the processor 370 for transmitting and receiving the various packets as discussed herein. The RF section 378 includes an RF receiver 382 which receives RF transmissions from a base station 108, 108' and/or distressed mobile device 124, via an antenna 126 and demodulates the signal to obtain the digital information modulated therein. The RF receiver 382 includes an RSSI output which is provided to the processor 370 for determining which response packet has the highest RSSI level as discussed above, for example. An example of a suitable RF receiver 382 for use in the mobile device 124 (as well as the base stations 108, 108') is the Model 025 Direct Sequence Spread Spectrum Radio Module, which is commercially available from Aironet Wireless Communications, Inc. of Akron, Ohio.

The RF section 378 also includes an RF transmitter 386. In the event the mobile device 124 is to transmit packets either to a base station 108, 108' or to a distressed mobile device 124, the processor 370 provides the packet to the RF transmitter 386. The RF transmitter 386 in turn transmits an RF signal with the packet modulated thereon via the antenna 126 to the base station 108, 108' or distressed mobile device 124 as intended.

Referring now to FIG. 7, a block diagram representative of each base station 108 is shown. The base stations 108 (indicating base stations 108') are conventional and hence will be described only briefly. Each base station 108 is connected to the system backbone 104 via a connector 440 such as a DB-9 or RJ-45 connector. The connector 440 is connected to the system backbone 104 at one end and to a network adapter transceiver 452 included in the base station 108 at the other end. The network adapter transceiver 452 is configured according to conventional network adapter transceiver techniques to allow the base station 108 to communicate over the system backbone 104. The network adapter transceiver 452 is also connected to an internal bus 454 included within the base station 108. The base station 108 further includes a processor 456 connected to the bus 454 for controlling and carrying out the operations of the base station 108. The processor 456 may include any of a variety of different microprocessors, such as the Motorola 68360 (25 MHz) or Intel 80386 microprocessors.

The base station 108 also includes a memory 458 connected to the bus 454. The memory 458 stores program code executed by the processor 456 to control the other elements within the base station 108 to carry out the functions described herein. The memory 458 also serves to buffer packets of information such as those received over the system backbone 104 or those transmitted to or received from the mobile devices 124. Moreover, the memory 458 functions to store information tables maintained by the processor 256 including information such as a list of the mobile devices 124 which are currently registered with the base station 108.

Also connected to the bus 454 is an RF section 460 included in the base station 108. The RF section 460 includes the aforementioned antenna 120 for receiving radio signals from and transmitting radio signals to mobile devices 124 within the cell area of the base station 108. Information transmitted from a mobile device 124 is received via the antenna 120 and is processed by an RF receiver 462 which demodulates and decodes the signal and converts the information to a digital signal having the aforementioned packet format. The processor 456 in the base station 108 inserts source routing information into the source routing field of the packet received from the mobile device, if needed. Thereafter, the processor 456 stores the packet in the memory 458 until such time as the base station 108 is able to transmit the information packet onto the system backbone 104 via the network adapter transceiver 452 and connector 440.

Packets which are transmitted to the base station 108 via the system backbone 104 for transmission to a mobile device 124 are received by the network transceiver 452. The processor 456 controls an RF transmitter 464 included in the RF section 460, the RF transmitter 464 also being connected to the bus 454. The processor 456 causes the RF transmitter 464 to modulate an RF signal using spread spectrum techniques, for example, which in turn carries the information packet to the appropriate mobile device 108. Exemplary hardware for carrying out the above-described basic functions of transmitting and receiving data between the system backbone 104 and one or more mobile devices 108 is found in the ARLAN 631® Token Ring Access Point, which is commercially available from Aironet Wireless Communications, Inc., Akron, Ohio.

The wireless base stations 108' are similar to the fixed base stations 108, but do not include a direct connection to the system backbone. Rather, the wireless base stations 108' communicate with the system backbone through one of the fixed base stations 108 as is conventional.

Although the invention has been shown and described with respect to certain preferred embodiments, it is obvious that equivalents and modifications will occur to others skilled in the art upon the reading and understanding of the specification. For example, although wireless communications using radio frequency communications are described, other forms are possible such as optical, infra-red, etc. Also, it is possible in the embodiment described above that a base station with which a distressed mobile device is registered via an intermediary mobile device may obtain duplicate packets in the event the distressed mobile device moved within direct range of the base station. Base stations typically are configured to ignore duplicate packets and hence such duplicity does not present a problem. However, such information could be utilized in an alternative embodiment by the base station to inform the distressed mobile device that direct registration is possible.

The present invention includes all such equivalents and modifications, and is limited only by the scope of the following claims.

What is claimed is:

1. An emergency routing method in a wireless communication system including a system backbone, a plurality of mobile devices, and one or more base stations coupled to the system backbone, the plurality of mobile devices being configured to move about the system and to communicate wirelessly with the system backbone by way of the one or more base stations, the emergency routing method comprising the steps of:

(a) a first mobile device among the plurality of mobile devices attempting to communicate with the system backbone by communicating wirelessly and directly with any of the one or more base stations;

(b) determining by the first mobile device whether the first mobile device is able to communicate directly with any of the one or more base stations; and (c) in the event the first mobile device is unable to communicate directly with any of the one or more base stations, the first mobile device establishing a wireless communication link with any of the one or more base stations using a second mobile device from among the plurality of mobile devices as an intermediary for communications between the first mobile device and the any of the one or more base stations.

2. The method of claim 1, wherein step (a) comprises the step of the first mobile device attempting to register with any of the one or more base stations according to a predefined registration procedure, and step (b) comprises the step of determining whether the registration procedure was successful.

3. The method of claim 1, wherein step (c) comprises the step of the first mobile device multicasting a distress notice indicating that the first mobile device is in need of another of the plurality of mobile devices to serve as the intermediary.

4. The method of claim 3, wherein step (c) further comprises the step whereby any of the plurality of mobile devices which receive the distress notice determine whether they are willing to serve as an intermediary and, if so, transmit a response notice back to the first mobile device indicating such willingness.

5. The method of claim 4, wherein step (c) further comprises the step of the first mobile device selecting the second mobile device to serve as the intermediary based on the response notices received by the first mobile device.

6. The method of claim 1, wherein the second mobile device maintains a table including the identity of any mobile devices for which it serves as an intermediary.

7. The method of claim 1, wherein step (c) comprises the step whereby with respect to any communications which the second mobile device receives which are either transmitted from the first mobile device or directed to the first mobile device, the second mobile device forwards the communications to their intended destination.

8. The method of claim 1, wherein step (c) comprises the step of the first mobile device registering with any of the one or more base stations using the second mobile device as the intermediary for communications relating to the registering.

9. The method of claim 1, wherein the first mobile device periodically repeats step (a).

10. The method of claim 1, wherein each of the mobile devices comprises a mobile data terminal.

11. The method of claim 10, wherein each of the mobile data terminals comprises a bar code scanner.

12. A wireless communication system, comprising:
a system backbone;
a plurality of mobile devices; and
one or more base stations coupled to the system backbone, the plurality of mobile devices being configured to move about the system and to communicate wirelessly with the system backbone by way of the one or more base stations,
wherein a first mobile device among the plurality of mobile devices comprises circuitry for attempting to communicate with the system backbone by communicating wirelessly and directly with any of the one or more base stations,
and in the event the first mobile device determines that it is unable to communicate directly with any of the one or more base stations the circuitry of the first mobile device establishes a wireless communication link with any of the one or more base stations using a second mobile device from among the plurality of mobile devices which include circuitry to operate as an intermediary for communications between the first mobile device and the any of the one or more base stations.

13. The system of claim 12, wherein the circuitry of the first mobile device multicasts a distress notice indicating that the first mobile device is in need of another of the plurality of mobile devices to serve as the intermediary in the event the first mobile device is unable to communicate directly with any of the one or more base stations.

14. The system of claim 13, wherein the plurality of mobile devices which receive the distress notice include circuitry for transmitting a response notice back to the first mobile device indicating a willingness to serve as the intermediary.

15. The system of claim 14, wherein the circuitry of the first mobile device selects the second mobile device to serve as the intermediary based on the response notices received by the first mobile device.

16. The system of claim 12, wherein the second mobile device maintains a table including the identity of any mobile devices for which it serves as an intermediary.

17. The system of claim 12, wherein with respect to any communications which the second mobile device receives which are either transmitted from the first mobile device or directed to the first mobile device, the second mobile device forwards the communications to their intended destination.

18. The system of claim 17, wherein each of the communications includes a source address and a destination address, and the second mobile device forwards the communications without altering the source address and the destination address.

19. The system of claim 12, wherein each of the mobile devices comprises a mobile data terminal.

20. The system of claim 19, wherein each of the mobile data terminals comprises a bar code scanner.

21. A mobile device for use in a in a wireless communication system including a system backbone, a plurality of other mobile devices, and one or more base stations coupled to the system backbone, the plurality of other mobile devices being configured to move about the system and to communicate wirelessly with the system backbone by way of the one or more base stations, the mobile device comprising:
a radio frequency (RF) transceiver;
a processor programmed to attempt to communicate with the system backbone by communicating wirelessly and directly via the RF transceiver with any of the one or more base stations, to determine whether the mobile device is able to communicate directly with any of the one or more base stations, in the event the mobile device is unable to communicate directly with any of the one or more base stations, for establishing a wireless communication link via the RF transceiver with any of the one or more base stations using a second mobile device from among the plurality of other mobile devices as an intermediary for communications between the mobile device and the any of the one or more base stations.

22. The mobile device of claim 21, wherein the device is a mobile data terminal.

23. An emergency routing method in a wireless communication system including a system backbone, a plurality of mobile devices, and one or more base stations coupled to the system backbone, the plurality of mobile devices being configured to move about the system and to communicate wirelessly with the system backbone by way of the one or more base stations, the emergency routing method comprising the steps of:
(a) a first mobile device among the plurality of mobile devices attempting to communicate with the system backbone by communicating wirelessly and directly with any of the one or more base stations;
(b) determining by the first mobile device whether the first mobile device is able to communicate directly with any of the one or more base stations; and
(c) in the event the first mobile device is unable to communicate directly with any of the one or more base stations, the first mobile device multicasting a distress notice which is receivable by any of the plurality of mobile devices in communication range of the first mobile device indicating the first mobile is in need of another of the plurality of mobile devices to serve as an intermediary;
(d) receiving a response notice from each of the plurality of mobile devices willing to serve as an intermediary in response to distress notice; and
(e) selecting in accordance with predetermined criteria a second mobile device to serve as an intermediary based on the response notices received by the first mobile terminal.

24. The method of claim 23, wherein the step of selecting in accordance with predetermined criteria includes the step of comparing the received signal strength associated with each of the response notices received by the first mobile terminal to determine which of the response notices provided the highest received signal strength.

25. The method of claim 23, wherein the step of selecting in accordance with predetermined criteria includes the step of determining which of the plurality of mobile devices from which a response notice was received provides the lowest number of hops to the system backbone.

* * * * *